UNITED STATES PATENT OFFICE.

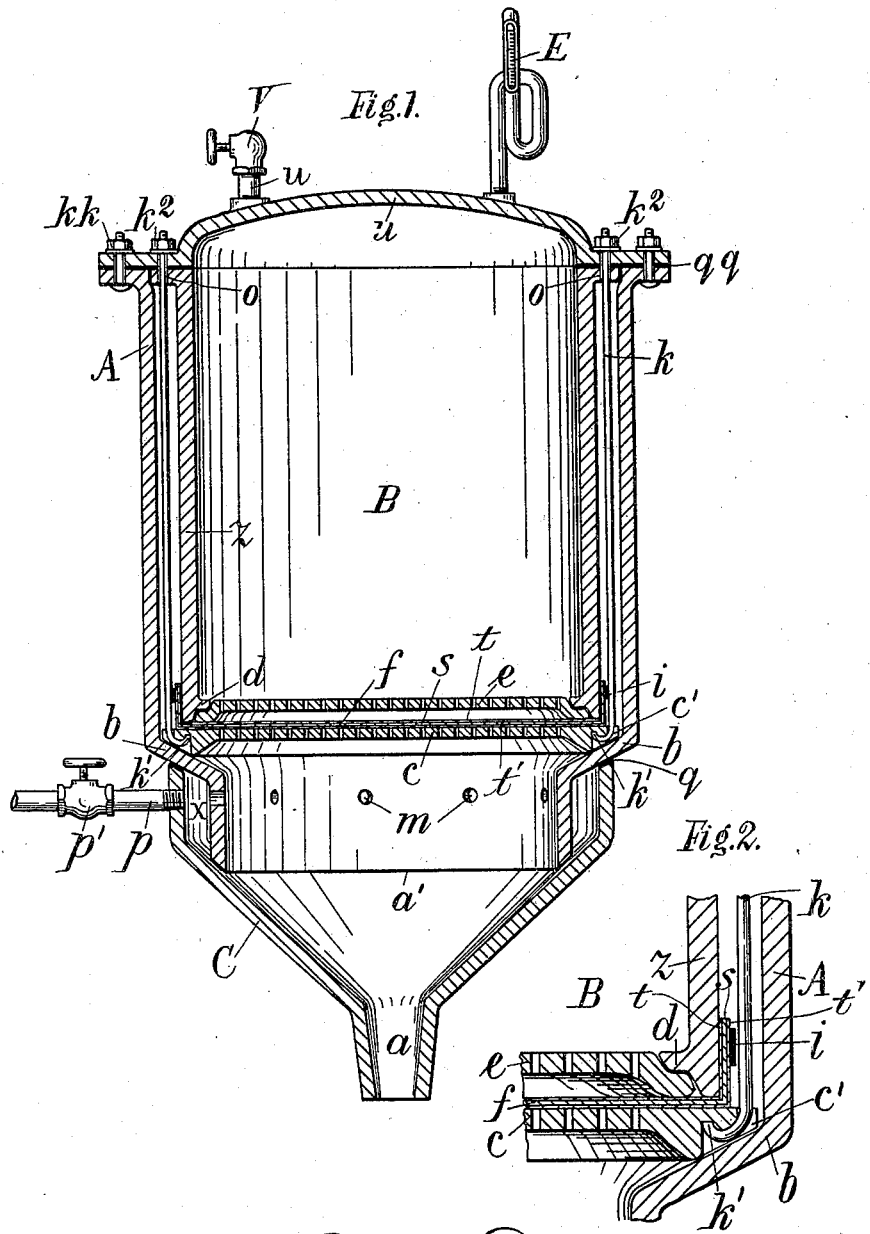

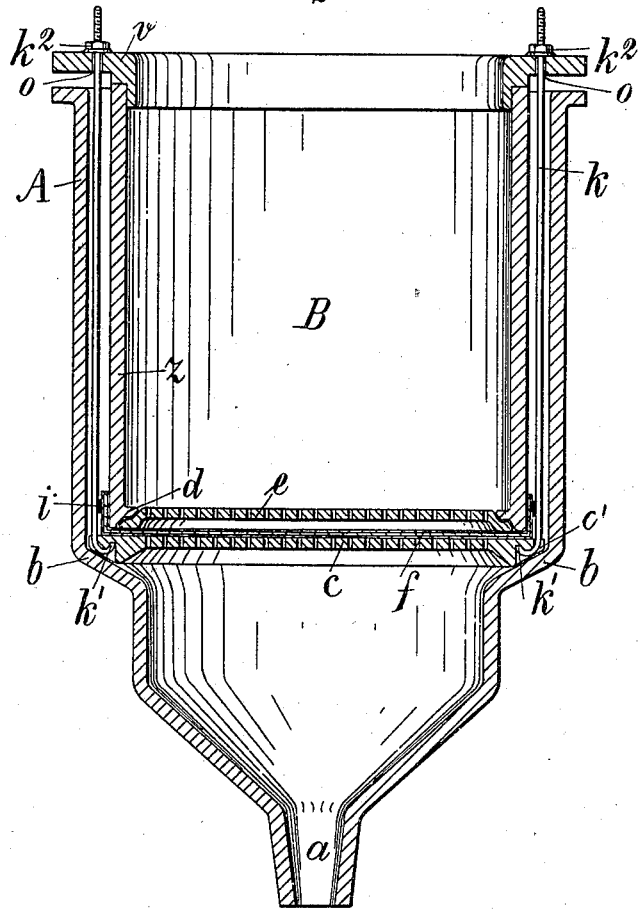

GUSTAV EBERHARD, OF NEW YORK, N. Y.

PRESSURE-FILTER.

SPECIFICATION forming part of Letters Patent No. 626,991, dated June 13, 1899.

Application filed June 10, 1898. Serial No. 683,081. (No model.)

*To all whom it may concern:*

Be it known that I, GUSTAV EBERHARD, of New York, county and State of New York, have invented certain new and useful Improvements in Pressure-Filters, of which the following is a full, clear, and exact specification, reference being had to the accompanying drawings, wherein—

Figure 1 is a sectional view, partly an elevation, of my improved filter. Fig. 2 is an enlarged detail showing the combination of the parts composing the bottom of the filtering vessel, and Fig. 3 is a sectional view of a modified construction of the filter.

My invention relates to filter appliances; and it consists of the hereinafter-described improvements in filters comprising the combination of parts whereby the substance operated upon in the filter may be submitted to the action of fluid agents by means of pressure or exhaust, or both, as may be required in the filtering process.

My improved filter consists of an outer vessel A and of an inner vessel B, adapted to be inserted therein, and of a funnel-shaped socket C, provided with an outlet $a$ approximately in center thereof. The outer vessel A is preferably cylindrical in shape. Its lower part is somewhat reduced in diameter to form the slanting flange $b$, on which the bottom of the inner vessel B rests, and which in turn rests upon the upper edge of the funnel-shaped socket C, which hereinafter will be referred to simply as "funnel." The inner vessel B consists of a cylindrical hollow portion or pot $z$ and the detachable perforated bottoms $c$ and $e$. Pot $z$ is provided with a flange $d$, fitted to the correspondingly-shaped circumference of the perforated bottom $e$. This flange $d$ holds the bottom $e$ safely in position when the parts of the vessel are joined together by bolts $k$, as will be explained hereinafter. The bottom $c$ is fitted upon the outer edge of the pot $z$ and rests upon the annular flange or shoulder $b$. In its circumference are provided dents or recesses $c'$, into which the curved ends $k'$ of the bolts $k$ are fitted. Between the bottoms $e$ and $c$ is stretched filtering-body $f$, composed of such substances as will be most serviceable to the purpose for which the filter is to be used. Thus in some instances this filtering-layer will be composed of felt, in other instances of alternate layers of cheese-cloth and filtering-paper, and in others of alternate layers of prepared skins and the like.

The filtering-body shown in the drawings consists of two layers $t$ and $t'$ of cheese-cloth and of one or more layers $s$ of filtering-paper laid between, and is attached to the bottom of the vessel B by band $i$. This filter also forms a packing between the lower edge of the pot $z$ and the detachable bottom $c$, preventing the escape of any liquid through the joint. The filtering-body rests upon the detachable bottom $c$ and is protected by the somewhat raised bottom $e$ to avoid excessive pressure of the filtered material upon the filtering-body. The inner vessel B is provided with a cover $u$, secured thereto by the bolts $k$; and both the inner vessel B and the outer vessel A are flanged to permit the securing thereto of the cover $u$. Suitable packing $q\,q$ is inserted between it and the flange of the outer vessel. Cover $u$ is provided with a pipe $u'$, fitted with back-pressure valve V, connecting the interior of the drum to an air pump or compressor, as may be required, and with a pressure-gage E for indicating the pressure within the filter.

Bolts $k$ hold together the several parts of the filtering vessel B. The flanges of the pot $z$ and of the cover $u$ are provided with corresponding bores $o$ and bottom $c$ with notches $c'$. Into these the hook-shaped ends $k'$ of the bolts $k$ are fitted, and their screw-threaded ends pass through bores $o$. Screw-nuts $k^2$ draw the parts securely together.

The funnel-shaped socket C is sufficiently wide to admit the reduced lower end of the vessel A to be set therein and is provided on its upper edge with a packing $q$ to form an air-tight joint. The lower terminus of the outer vessel A is open and when inserted in the funnel C an annular space $x$ is formed, communicating with the interior of the funnel by the clearance along the edge $a'$. Apertures $m$, provided in the reduced part of the outer vessel A near the flange $b$, communicates with this annular space $x$, which may be connected by pipe $p$ to an exhaust-pump. The purpose of this arrangement is to expedite the filtering process by exhausting the air below, while pressure is exerted from above upon the material filled in the filtering vessel or to expedite the drying process when the recovery of the residue is the purpose of the filtering process. The arrangement may also be used in what is called "as washing" when a liquid is used to extract some part or a substance from the material subjected to its action in the filter and, namely, in cases where the recovery of the extracting medium is desired.

In the modified construction shown in Fig. 3 of the drawings the exhausting device is omitted and the outer vessel A and funnel C are integral. The upper edge of the pot $z$ is not flanged, and instead a flanged ring $v$ is fitted upon its upper edge and provided with bores $o$. The separable bottom $c$ is provided with notches $c'$, into which the hook-shaped ends $k'$ of the bolts $k$ engage. Their screw-threaded ends pass through the bolt-holes $o$, provided in the ring $v$ and cover $u$, and nuts $k^2$ are screwed thereon, holding the parts together in the same manner as explained above. The parts of this filter are preferably made of porcelain or glass. The ring $v$ is made of non-corroding moderately-hard metal or metallic alloy the same as the cover. Such a filter is required for many different purposes in chemical factories.

The shape of the filter and also the material of which it is constructed may be varied according to requirements of the use for which the filter is intended. For ordinary purposes both the pot and also the outer vessel may be produced of copper coated with tin. In some instances it will be required that they be lined with lead or porcelain—as, for instance, when the filter is to be used in manufacture of certain chemicals.

My improved filter is suitable for all filtering processes whether requiring pressure or not. It is, however, intended mainly to be used in processes wherein the recovery of the residue is the main purpose of the filtering.

I claim as my invention and desire to secure by Letters Patent—

1. A filter comprising a flanged pot, a detachable perforated bottom set within the pot and provided with a depressed flange fitted to engage with the inner flange of the pot, a second perforated bottom fitted upon the outer edge of the pot and provided with recesses in its periphery projecting beyond the end of the pot, a layer of filtering material stretched between the two perforated bottoms, screw-bolts, having their hooked ends set in the recesses of the second perforated bottom, and their screw-threaded ends passed through bores in the upper, outwardly-projecting flange of the pot, and screw-nuts screwed upon the bolts and holding the several parts securely together.

2. A filter comprising a flanged pot, a detachable perforated bottom set within the pot and provided with a depressed flange fitted to engage with the inner flange of the pot, a second perforated bottom fitted upon the outer edge of the pot and provided with recesses in its periphery projecting beyond the end of the pot, a layer of filtering material stretched between the two perforated bottoms, a flanged cover, fitted upon the pot and provided with bores corresponding with those in its outwardly-projecting flange, a packing laid between the flange of the pot and the flange of the cover, an inlet-pipe set in the cover and provided with a back-pressure valve, a pressure-gage mounted upon the cover and communicating with the interior of the pot, screw-bolts having their hooked ends set in the recesses of the outer bottom and their screw-threaded ends passed through the bores in the flanges of the pot and of the cover, screw-nuts screwed upon the bolts and holding the several parts securely together, and means for forcing a compressible fluid into the filter vessel.

3. In combination a funnel-shaped socket having an outlet in the apex of its bottom and an inlet-pipe provided with a stop-cock set in its side, a cylindrical outer vessel, having an outwardly-projecting flange around its upper edge and an inwardly-drawn slanting shoulder near its open bottom, and provided with perforations between the shoulder and its lower edge, a flanged pot, a detachable perforated bottom set within the pot and provided with a depressed flange fitted to engage with the inner flange of the pot, a second perforated bottom fitted upon the outer edge of the pot and provided with recesses in its periphery projecting beyond the end of the pot, a layer of filtering material stretched between the two perforated bottoms, a flanged cover, fitted upon the pot and upon the outer vessel and provided with bores corresponding with those in their outwardly-projecting flanges, a packing laid between the flange of the hull and the flange of the cover, an inlet-pipe set in the cover, a back-pressure valve, set in the inlet, a pressure-gage mounted upon the cover and communicating with the interior of the pot, screw-bolts having their hooked ends set in the recesses of the outer bottom and their screw-threaded ends passed through bores provided in the flanges of the pot and of the cover, screw-nuts screwed upon the bolts and holding the several parts securely together, means for forcing expansive fluid into the filter and means for exhausting it from the closed space below.

In witness that I claim the improvements described in the foregoing specification I have signed my name in the presence of two subscribing witnesses.

GUSTAV EBERHARD.

Witnesses:
ROBERT VALENTINE MATHEWS,
HARRY CALHOUN.